(12) United States Patent
Zhang et al.

(10) Patent No.: US 9,437,870 B2
(45) Date of Patent: Sep. 6, 2016

(54) NANO-SILICON COMPOSITE LITHIUM ION BATTERY ANODE MATERIAL COATED WITH POLY (3,4-ETHYLENEDIOXYTHIOPHENE) AS CARBON SOURCE AND PREPARATION METHOD THEREOF

(75) Inventors: Lingzhi Zhang, Guangzhou (CN); Lu Yue, Guangzhou (CN); Suqing Wang, Guangzhou (CN); Xinyue Zhao, Guangzhou (CN)

(73) Assignee: GUANGZHOU INSTITUTE OF ENERGY CONVERSION, Guangzhou (CN)

( * ) Notice: Subject to any disclaimer, the term of this patent is extended or adjusted under 35 U.S.C. 154(b) by 263 days.

(21) Appl. No.: 14/131,385

(22) PCT Filed: Aug. 26, 2011

(86) PCT No.: PCT/CN2011/079008
§ 371 (c)(1),
(2), (4) Date: Jan. 7, 2014

(87) PCT Pub. No.: WO2013/010346
PCT Pub. Date: Jan. 24, 2013

(65) Prior Publication Data
US 2014/0113199 A1    Apr. 24, 2014

(30) Foreign Application Priority Data
Jul. 15, 2011    (CN) .......................... 2011 1 0199707

(51) Int. Cl.
| | |
|---|---|
| *H01M 4/133* | (2010.01) |
| *H01M 4/134* | (2010.01) |
| *H01M 4/1393* | (2010.01) |
| *H01M 4/1395* | (2010.01) |
| *H01M 10/0525* | (2010.01) |
| *C01B 33/18* | (2006.01) |
| *H01M 4/36* | (2006.01) |
| *H01M 4/38* | (2006.01) |

(52) U.S. Cl.
CPC .............. *H01M 4/366* (2013.01); *C01B 33/18* (2013.01); *H01M 4/1395* (2013.01); *H01M 4/386* (2013.01); *H01M 10/0525* (2013.01); *Y02E 60/122* (2013.01); *Y02T 10/7011* (2013.01)

(58) Field of Classification Search
CPC .. H01M 4/1395; H01M 4/366; H01M 4/386; C01B 33/18
USPC ............ 429/218.1, 231.8; 252/502; 427/216, 427/220, 221
See application file for complete search history.

(56) References Cited

U.S. PATENT DOCUMENTS

| | | |
|---|---|---|
| 2010/0261050 A1 | 10/2010 | Kang et al. |
| 2010/0288970 A1 | 11/2010 | Watanabe et al. |

FOREIGN PATENT DOCUMENTS

| | | |
|---|---|---|
| CN | 101826612 A | 9/2010 |
| CN | 101850959 A | 10/2010 |
| CN | 101908616 A | 12/2010 |
| CN | 101931076 A | 12/2010 |

OTHER PUBLICATIONS

International Search Report dated Apr. 26, 2012, issued in corresponding application No. PCT/CN2011/079008.

*Primary Examiner* — Sean P Cullen
(74) *Attorney, Agent, or Firm* — Westerman, Hattori, Daniels & Adrian, LLP

(57) ABSTRACT

A high-performance new silicon composite material for a negative electrode of a lithium ion battery and a preparation method thereof by utilizes a conductive polymer PEDOT and a water solution dispersant PSS as a coating layer of nano-Si powder and a carbon source. The Si/C composite material taking a Si-containing type lithium storage material as a main active substance is prepared by firstly polymerizing PEDOT: PSS on the surface of Si through in-situ polymerization reaction and then performing high-temperature carbonization treatment on a prepared Si/PEDOT: PSS composite under an inert atmosphere. The prepared composite material is doped with a small amount of S element. Nano-Si particles are uniformly embedded in a PEDOT: PSS polymer and a carbon matrix. A high yield is achieved by using cheap raw materials and a simple and environment-friendly process. The prepared Si/C composite material has very low initial irreversible capacity loss (2.8%) and excellent charge-discharge.

5 Claims, 5 Drawing Sheets

US 9,437,870 B2

NANO-SILICON COMPOSITE LITHIUM ION BATTERY ANODE MATERIAL COATED WITH POLY (3,4-ETHYLENEDIOXYTHIOPHENE) AS CARBON SOURCE AND PREPARATION METHOD THEREOF

FIELD OF THE INVENTION

The present invention relates to the technical field of lithium ion battery negative electrode materials, in particular to a novel silicon composite material for a negative electrode of a lithium ion battery and a preparation method thereof.

BACKGROUND OF THE INVENTION

Lithium ion batteries have the advantages of high open-circuit voltage, high energy density, long service life, no memory effect, little pollution, small self-discharge rate and the like, and the overall performances are better than those of other traditional secondary batteries, thereby being consistently considered to be the most ideal power supplies for various portable electronic equipment and electric vehicles. Although graphite, which is a traditional lithium ion battery negative electrode material, has good cycle stability and relatively high performance-price ratio, but because the charge-discharge specific capacity is lower and the volume specific capacity has no advantage, graphite hardly meets the requirements of power systems, in particular to electric vehicles and hybrid electric vehicles for high capacity of the batteries. Therefore, it is very urgent to develop novel lithium ion battery negative materials with high specific capacity, high charge-discharge efficiency and long cycle life. In the studies of the novel non-carbon negative electrode materials, due to the highest theoretical lithium intercalation capacity (4200 mAh/g, which is much higher than that of all the other current negative electrode materials), Si-based materials have attracted more and more attention. If Si-based negative electrodes can achieve the practical degree, the range of applications of the lithium ion batteries will surely be greatly expanded. However, the Si-based materials have serious volume effect under high-degree lithium deintercalation conditions, thereby resulting in a significant decline in cycle stability of electrodes. Against the volume efficiency of silicon, silicon is compounded with a carrier with elasticity and stable performances to buffer the volume change of silicon, so that this way will be an effective one for keeping the high capacity of silicon and simultaneously improving the cycle stability thereof. Carbon has the advantages of lighter mass, better electric conductivity, lower lithium intercalation electric potential, small volume change during a lithium deintercalation process, low price and the like, thereby being widely applied in Si composite materials. In recent years, conductive polymers, such as polyaniline, polypyrrole and the like, are also tried as objects of the Si composite materials due to high electric conductivity, good lattice elasticity and the like. As organic polymer materials, the conductive polymers can also be used as carbon sources for preparing carbon materials. Wang et al. prepared carbon spheres with the diameter of less than 100 nm, which are doped with N atoms, by carbonizing polypyrrole nano-spheres; and by applying the carbon spheres to the negative electrodes of the lithium ion batteries, the batteries can still keep the reversible capacity of 400 mAh·g$^{-1}$ after 60 cycles of operation (Ind. Eng. Chem. Res., 47(2008): 2294-2300). But till now, only Zhang et al. took polyparaphenylene in the conductive polymers as the carbon source for preparing a Si/C composite material for researching the negative electrodes of the lithium ion batteries (J. Power Sources, 125(2004): 206-213.).

The conductive polymer poly-ethylenedioxythiophene (PEDOT) has attracted much attention of people due to the extensive application prospects. The conductive polymer in a doping state has excellent performances including high electric conductivity, high stability in structure and electric conductivity in air and the like, thereby becoming a new research hotspot of the conductive polymers. The PEDOT in the eigenstate has very poor electric conductivity and is non-melt and insoluble, and polystyrene sulfate (PSS) radical anion-doped PEDOT can be dispersed and dissolved in a water solution, is very stable in the air after being coated to form a film and simultaneously has high electric conductivity; and furthermore, the water solution can be further processed so as to greatly promote the application of the PEDOT. So far, PEDOT or PEDOT: PSS has been mainly used as a positive electrode material of the lithium ion battery (Electrochim. Acta, 53(2008): 8319-8323), or used for related research as a composite material for a positive electrode (Electrochem. Commun., 4(2002): 545-549). The structure unit of each of PEDOT and PSS contains one S atom, and the carbonized material thereof may be doped with a small amount of heteroatom S. However, Yu et al. believed that the formation of a —C—S—C— bond in the carbon material is more conductive to insertion of lithium ions (J. Power Sources, 108(2002): 245-249). Therefore, the novel Si/C composite material doped with the small quantity of S atoms can be further prepared by preparation of a Si/PEDOT: PSS composite material followed by carbonization treatment.

SUMMARY OF THE INVENTION

An object of the present invention is provide a novel high-performance silicon composite material for a negative electrode of a lithium ion battery by utilizing a conductive polymer PEDOT and a water solution dispersant PSS of the conductive polymer PEDOT as a coating layer of nano-Si powder and a carbon source.

Another object of the present invention is to provide a preparation method of the abovementioned silicon/carbon composite material.

An active substance in the silicon/carbon composite material is nano-silicon powder, a dispersion medium is carbon after high-temperature cracking of a conductive polymer poly(3,4-ethylenedioxythiophene) (PEDOT), and the silicon content can be controlled at 60-90 wt % by regulating the proportion of EDOT monomer (3,4-ethylenedioxythiophene) to the nano-silicon powder. A precursor of the dispersion medium is the conductive polymer poly(3,4-ethylenedioxythiophene) (PEDOT); and in order to prepare the composite material easily, a water solution of polystyrene sulfonic acid (PSS) is taken as a dispersant of the PEDOT. As the structure unit of each of PEDOT and PSS contains one S atom, the carbon coated outside nano-Si particles is the carbon doped with a small amount of S after carbonization of the Si/PEDOT: PSS composite material disclosed by the present invention.

The silicon/carbon composite material taking a nano-Si-containing type lithium storage material as a main active substance is prepared by firstly polymerizing PEDOT: PSS on the surface of the nano-Si particles through in-situ polymerization reaction and then performing high-temperature carbonization treatment on the prepared Si/PEDOT: PSS composite under an inert atmosphere. As in the preparation the chemical process is firstly performed, Si and carbon are better contact in the composite material prepared later; and in addition, due to the doping of S element (the carbon source contains S atoms), the electrochemical properties of the composite material are greatly improved.

Taking water as the dispersion medium and $Fe_2(SO_4)_3$/$(NH_4)_2S_2O_8$ as a catalyst, the Si/C composite material of the present invention is prepared by firstly preparing the Si/PEDOT: PSS composite material by in-situ polymerization under magnetic stirring, and then performing high-temperature carbonization. The specific steps are as follows:

(1) slowly adding the precursor monomer EDOT into the water solution of PSS, and performing homogeneous dispersion treatment;
(2) adding the nano-silicon powder in step (1), performing ultrasonic dispersion and uniformly stirring;
(3) regulating the pH value of the solution in step (2) to about 2 by using dilute hydrochloric acid;
(4) dropwise adding the water solution of $(NH_4)_2S_2O_8$/$FeCl_3$ into the solution in step (3) under the ice bath condition for being used as a catalyst;
(5) firstly subjecting the mixed solution in step (4) to an ice bath for 6 h and then reacting at room temperature for 18 h, filtering to get the Si/PEDOT: PSS composite, heating the Si/PEDOT: PSS composite to 800-1000° C. under protective gas, and performing heat preservation and carbonization for 3 h; and
(6) cooling after the end of the reaction.

The raw materials for preparation of the present invention are cheap, the coating of nano-Si in the conductive polymer is performed in a water solution, the process is simple and environment-friendly, and the yield is high. The prepared Si/C composite material has very low initial irreversible capacity loss (2.8%) and excellent charge-discharge performance, facilitates industrial production and has potential application prospects in electric vehicles and other power supplies.

BRIEF DESCRIPTION OF THE DRAWINGS

FIG. 2A to 2F are SEM and TEM photos of prepared samples and related samples according to the embodiment of the present invention, in which FIG. 2A and FIG. 2B are SEM and TEM photos of Si, FIG. 2C and FIG. 2D are SEM and TEM photos of Si/PEDOT: PSS, and FIG. 2E and FIG. 2F are SEM photos of Si/C.

DETAILED DESCRIPTION OF THE INVENTION

Figure 1:
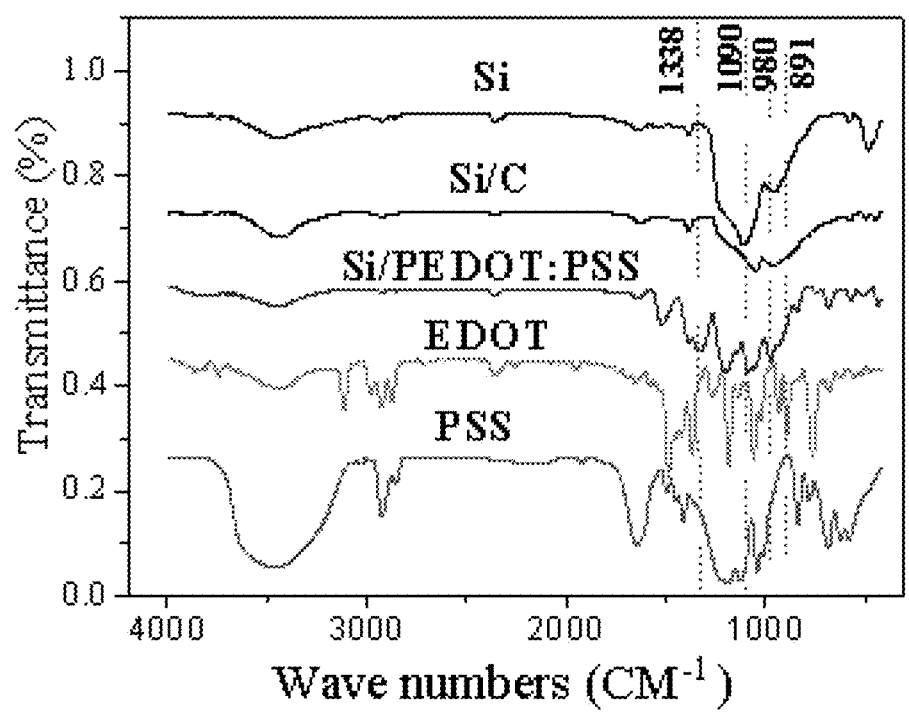
FIG. 1 is infrared spectra of Si/C, Si/PEDOT: PSS, EDOT, PSS and Si according to an embodiment of the present invention.

The specific preparation steps of the Si/C composite material of the present invention are as follows:
slowly adding EDOT monomers into a water solution of PSS, performing ultrasonic dispersion for 30-60 min, and violently stirring for 1-2 h at the temperature of 0-5° C.; adding nano-silicon powder into the above solution and performing ultrasonic dispersion for 60 min; regulating the pH value of the above mixed solution to 2-3 by using 2M dilute hydrochloric acid; dropwise adding the water solution of $(NH_4)_2S_2O_8$/$FeCl_3$ into the above mixed solution at the temperature of 0-5° C. as a catalyst, performing ultrasonic dispersion for 30-60 min, reacting for 6 h under stirring situations, removing an ice bath, and continuously stirring for 18 h at room temperature; filtering, washing and drying a polymerization product to get a Si/PEDOT: PSS composite; and heating the composite to 800-900° C. under protective gas, and performing heat preservation and carbonization for 3 h to get a Si/C composite material.

The adding amount of Si is 1-2 times the mass of the EDOT monomer.

The adding amount of $(NH_4)_2S_2O_8$ is 1.5-3 times the mass of the EDOT monomer.

The adding amount of $FeCl_3$ is 0.01-0.05 time the mass of the EDOT monomer.

The adding amount of the PSS is 1.5-4 times the mass of the EDOT monomer.

The protective gas is Ar, $N_2$ or Ar/$H_2$ mixed gas. The heating rate of the reaction is 1-5° C./min.

Embodiment 1

Slowly add 0.28 g of EDOT monomer into a water solution (90 mL) containing 0.82 g of PSS, perform ultrasonic dispersion for 60 min, and violently stir for 1-2 h under an ice bath; add 0.4 g of nano-silicon powder into the above solution and perform ultrasonic dispersion for 60 min; regulate the pH value of the above mixed solution to 2 by using 2M dilute hydrochloric acid; dropwise add the water solution of $(NH_4)_2S_2O_8$/$FeCl_3$ (6 mg) into the above mixed solution under ice bath conditions, perform ultrasonic dispersion for 60 min, react for 6 h under stirring situations, remove the ice bath, and then stir for 18 h at room temperature; filter a polymerization product, then wash with ethanol for three times (for removing organic matters which are not fully reacted), further wash with deionized water for three times (for removing some ions and the excessive PSS), and perform vacuum drying for 24 h at the temperature of 60° C. Heat the composite after drying to 800° C. at the rate of 3° C./min under the protection of Ar, perform heat preservation and carbonization for 3 h and naturally cool to get a Si/C composite material. Fully grind the prepared material, then uniformly mix with carbon black and carboxymethyl cellulose according to the proportion of 62:30:8, coat to form a film, and perform vacuum drying for 24 h at the temperature of 60° C. to prepare a Si/C electrode. Perform a constant current charge-discharge test on a battery assembled by arranging the electrode in a 2025 battery case, taking a lithium sheet as a counter electrode, taking a polyethylene film as a separator and taking 1M $LiPF_6$ EC/DEC (v/v=1/1) as an electrolyte.

The structures, the appearances and the like of the Si/C composite material and the precursor Si/PEDOT: PSS composite material thereof, which are prepared by the present invention, are tested and characterized by the following infrared spectra, SEM and TEM photos, XRD spectra and TG spectra.

1. Infrared Spectrum Analysis

FIG. 1 is infrared spectra of Si/C, Si/PEDOT: PSS, EDOT, PSS and Si. It can be seen from the spectrum of the Si/PEDOT that a —C—S— peak (980 $cm^{-1}$), —C—O—C— stretching vibration peak (1090 $cm^{-1}$) and stretching vibration peak (1338 $cm^{-1}$) representing C—C and C=C quinone group structures on a thiophene ring occur clearly in the spectrum. In addition, a=C—H vibration peak (891 $cm^{-1}$) representing the characteristic peak of the monomer EDOT disappears on the spectrum of the Si/PEDOT: PSS. The above results show that polymerization of EDOT is successfully realized. However, from the spectrum of the Si/C composite, it is found that the stretching vibration peak (1338 $cm^{-1}$) representing the C—C and the C=C quinone group structures on the thiophene ring disappears completely, showing that the PEDOT: PSS structure has been completely transformed into a carbon structure after carbonization at the temperature of 800° C.

2. Electron Microscope Analysis

Figure 2A:
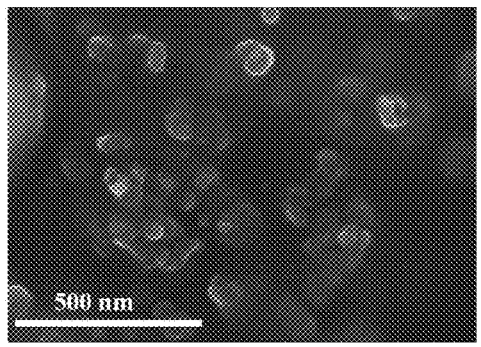
Figure 2B:
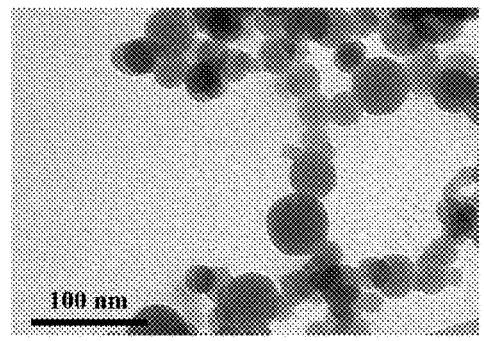
Figure 2C:
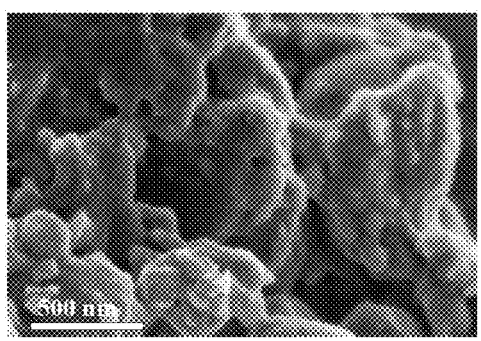
Figure 2D:
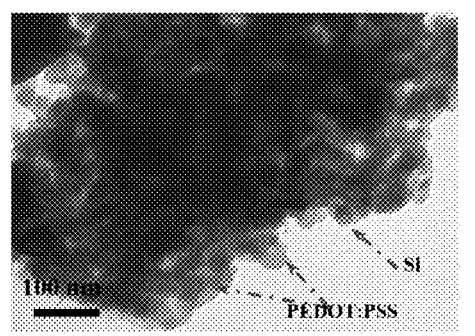
Figure 2E:
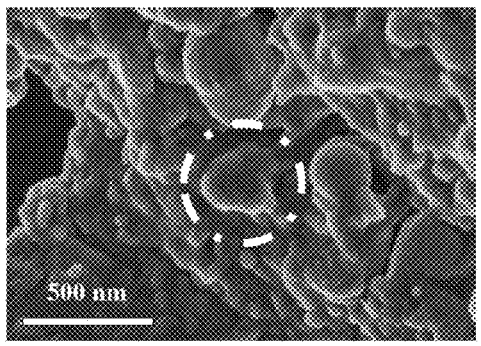
Figure 2F:
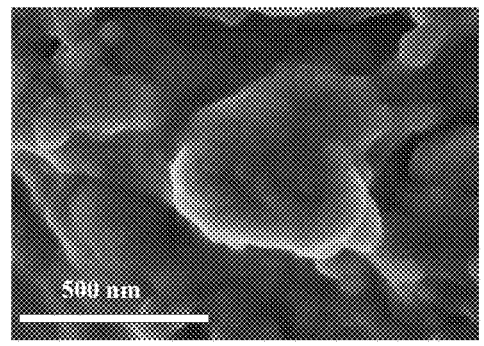
Figure 3:
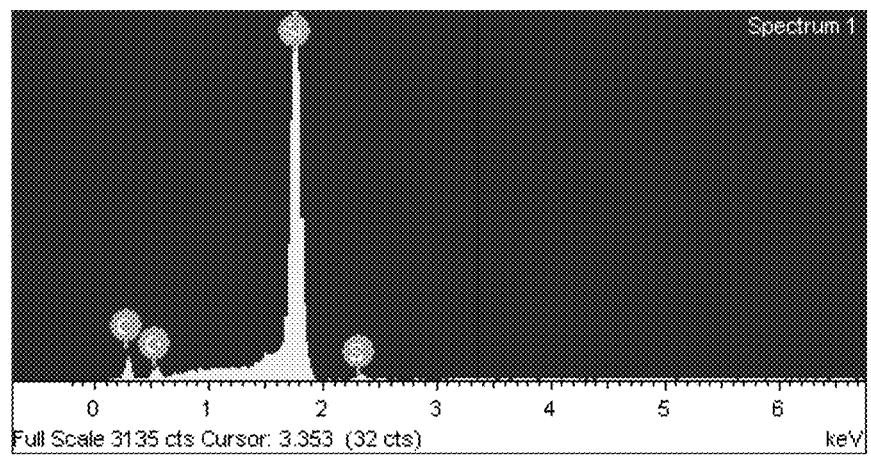
FIG. 3 is an X-ray energy dispersive spectrum (EDS) of a Si/C composite material according to the embodiment of the present invention.

FIG. 2A to 2F are SEM or TEM photos of prepared samples and related samples of the present invention. FIG. 2A and FIG. 2B are SEM and TEM photos of nano-silicon particles, and it can be seen that the Si particles are in the size range of 30-50 nm and shaped like spheres. FIG. 2C and FIG. 2D are SEM and TEM photos of Si/PEDOT: PSS, and it can be seen that Si/PEDOT: PSS forms a larger agglomerate and the nano-Si particles are homogeneously dispersed in lattices of PEDOT: PSS. FIG. 2E and FIG. 2F are SEM photos of a Si/C composite, and it can be seen that the Si particles are fully coated in C lattices. FIG. 3 is an EDS analysis diagram of SEM, showing that the Si/C composite is doped with a small amount of S, the content which is about 1.1 wt %.

3. XRD Analysis

Figure 4:
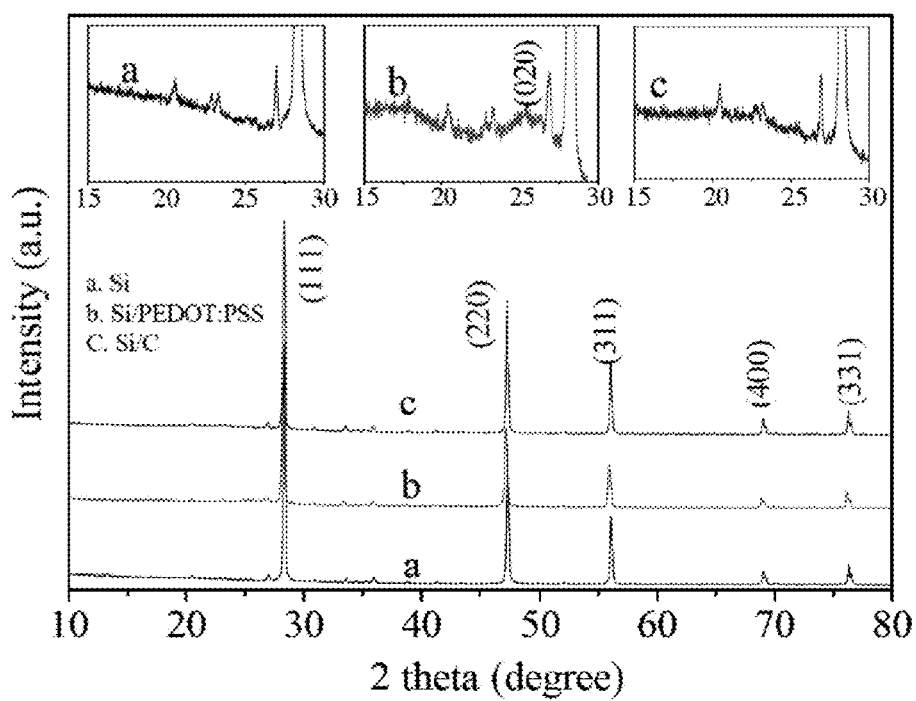
FIG. 4 is XRD (X-ray diffraction) spectra of prepared samples and related samples according to the embodiment of the present invention, in which (a) refers to Si, (b) refers to Si/PEDOT: PSS and (c) refers to Si/C.

FIG. 4 is XRD spectra of Si, Si/PEDOT: PSS and Si/C. FIG. 4 (a) is the XRD spectrum of Si, and diffraction peaks at 28.4°, 47.4°, 56.2°, 69.2° and 76.5° respectively represent lattice planes of (111), (220), (311), (400) and (331) of Si. All the diffraction peaks emerge on a diffraction spectrum of Si/PEDOT of FIG. 4 (b) and the diffraction spectrum of Si/C of FIG. 4 (c). The diffraction spectrum of Si/PEDOT shows that the diffraction peak appears in the vicinity of 26.0° and the diffraction peak is the characteristic diffraction peak of the lattice plane of (020) of the polymer PEDOT. In addition, only a weak broad peak appears between 20.0° and 25° on the diffraction spectrum of Si/C, and there is no obvious diffraction peak representing graphite carbon, showing that carbon formed after high-temperature carbonization of PEDOT: PSS is of an amorphous structure.

4. TG Analysis

Figure 5:
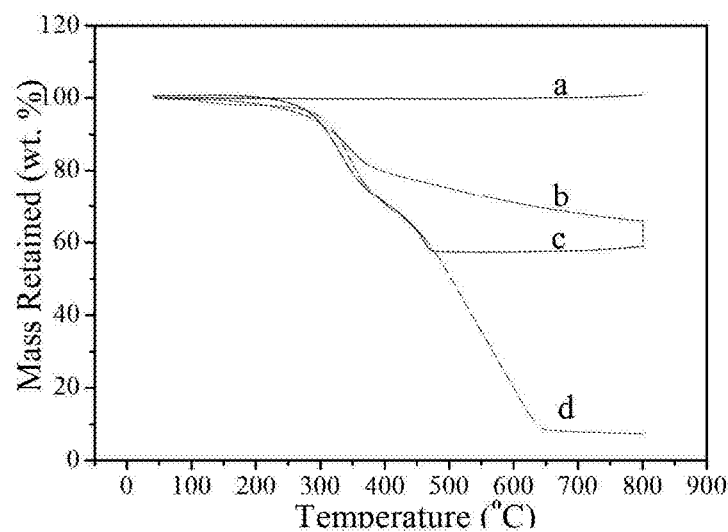
FIG. 5 is thermogravimetric curves of Si, Si/PEDOT: PSS and Si/C under an air atmosphere (10° C./Min) and Si/PEDOT: PSS under an Ar atmosphere (the heating is set to be the same as the experimental process, and the temperature is constant at 800° C. for 3 h) according to the embodiment of the present invention, in which (a) refers to the Si under the air atmosphere, (b) refers to the Si/PEDOT: PSS under the Ar atmosphere, (c) refers to the Si/PEDOT: PSS under the air atmosphere and (d) refers to the PEDOT: PSS under the air atmosphere.

FIG. 5 is thermogravimetric curves of Si, Si/PEDOT: PSS and Si/C under an air atmosphere and Si/PEDOT: PSS under an Ar atmosphere. Based on the mass loss of different samples under the air or the inert atmosphere at the temperature of 800° C., it can be speculated that the content of Si in the Si/PEDOT: PSS composite is about 51.6%, and the content of Si in the Si/C composite is about 85.7 wt %.

The electrochemical properties of the Si/C composite material prepared by the present invention are tested and characterized below through cycle performance tests and alternating current impedance spectra.

5. Cycle Performance Tests

Figure 6:
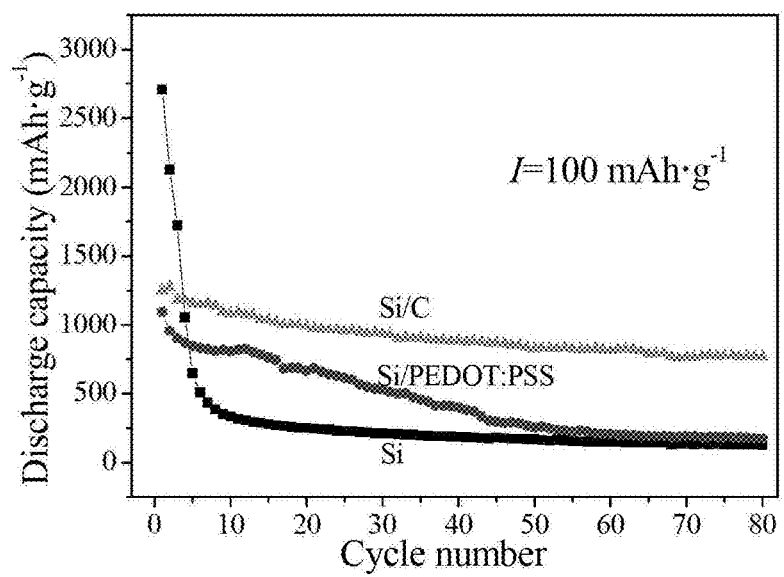
FIG. 6 is cycle performance test curves of electrodes prepared from Si, Si/PEDOT: PSS and Si/C materials under charge-discharge current density of 100 mA·$g^{-1}$ according to the embodiment of the present invention.

FIG. 6 is cycle performance test curves of electrodes prepared from Si/C, Si and Si/PEDOT: PSS materials under charge-discharge current density of 100 $mA \cdot g^{-1}$. From the figure, it can be seen that the capacity fading rate of Si is the maximum, which is significantly faded from initial 2710 $mAh \cdot g^{-1}$ to 128 $mAh \cdot g^{-1}$ after 80 cycles. Compared with the Si electrode, the fading rate of the electrode prepared from the Si/PEDOT: PSS composite material becomes slow, but the irreversible capacity loss is still large. The cycle performance of the electrode prepared from the Si/C composite material is obviously improved, the first irreversible capacity loss is only 2.8%, and the capacity of 768 $mAh \cdot g^{-1}$ can be still kept after 80 cycles.

6. Alternating Current Impedance Tests

Figure 7:
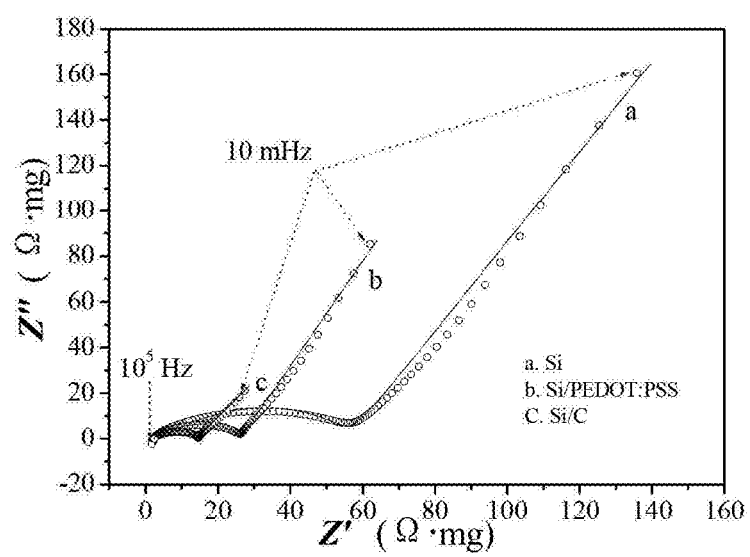
FIG. 7 is Nyquist plots of alternating current impedance tests of electrodes prepared from Si, Si/PEDOT: PSS and Si/C materials according to the embodiment of the present invention.

FIG. 7 is alternating current impedance tests of electrodes prepared from Si/C, Si and Si/PEDOT: PSS materials. Results after fitting find that, compared with the Si electrode, the charge transfer resistance of the Si/C electrode is reduced by 5 times, and the double-layer capacitance is increased by 4 times, so that the Si/C electrode can operate under lower polarization, and the performances are greatly improved.

In conclusion, in the Si/C composite material prepared by the present invention, the nano-Si is successfully coated in a carbon matrix after carbonization of the conductive polymer PEDOT: PSS, the volume expansion of the Si particles are effectively inhibited during the charge-discharge process, and the cycle performance of the material is greatly improved.

The invention claimed is:

1. A silicon/carbon composite material as a negative electrode for a lithium ion battery, having a nano-silicon powder as an active substance, and a carbon coating outside the nano-silicon powder being S-doped carbon, the S-doped carbon being obtained by carbonization of substances including a conductive polymer poly(3,4-ethylenedioxythiophene) and polystyrene sulfonic acid as a dispersant of poly(3,4-ethylenedioxythiophene), said silicon/carbon composite material as the negative electrode for the lithium ion battery being prepared using a method comprising the steps of:

(1) adding a precursor monomer 3,4-ethylenedioxythiophene into a water solution of the polystyrene sulfonic acid and performing homogeneous dispersion treatment;

(2) adding the nano-silicon powder to a solution obtained in step (1), and then performing ultrasonic dispersion and uniformly stirring;

(3) adjusting the pH value of the solution in step (2) by using 2M hydrochloric acid;

(4) dropwise adding a water solution of $(NH_4)_2S_2O_8$/$FeCl_3$ into the solution in the step (3) under an ice bath condition for being used as a catalyst;

(5) firstly subjecting the mixed solution in the step (4) to an ice bath for 6 hours and then reacting at room temperature for 18 hours, and filtering to get a Si/PEDOT: PSS composite; and (6) heating the Si/PEDOT: PSS composite to 800-1000° C. under protective gas, performing heat preservation and carbonization, and cooling after an end of a reaction.

2. The silicon/carbon composite material as a negative electrode for a lithium ion battery according to claim 1, wherein the carbonization is for 3 hours.

3. A preparation method of a silicon/carbon composite material for a negative electrode of a lithium ion battery comprising the steps of:
(1) adding precursor monomers 3,4-ethylenedioxythiophene into a water solution of polystyrene sulfonic acid and performing homogeneous dispersion treatment;
(2) adding nano-silicon powder to a solution obtained in step (1), and then performing ultrasonic dispersion and uniformly stirring;
(3) regulating the pH value of the solution in step (2) by using 2M hydrochloric acid;
(4) dropwise adding a water solution of $(NH_4)_2S_2O_8$/$FeCl_3$ into the solution in the step (3) under an ice bath condition for being used as a catalyst;
(5) firstly subjecting the mixed solution in step (4) to an ice bath for 6 hours and then reacting at room temperature for 18 hours, and filtering to get a Si/PEDOT: PSS composite; and
(6) heating the Si/PEDOT: PSS composite to 800-1000° C. under Ar gas, performing heat preservation and carbonization, and cooling after an end of a reaction.

4. The preparation method of the silicon/carbon composite material for the negative electrode of the lithium ion battery according to claim 3, wherein an adding amount of Si is 1-2 times a mass of the precursor monomers 3,4-ethylenedioxythiophene, an adding amount of $(NH_4)_2S_2O_8$ is 1.5-3 times the mass of the precursor monomers 3,4-ethylenedioxythiophene, an adding amount of $FeCl_3$ is 0.01-0.05 time the mass of the precursor monomers 3,4-ethylenedioxythiophene, and an adding amount of an PSS is 1.5-4 times the mass of the precursor monomers 3,4-ethylenedioxythiophene.

5. The preparation method of the silicon/carbon composite material for the negative electrode of the lithium ion battery according to claim 3, wherein the carbonization is for 3 hours.

* * * * *

UNITED STATES PATENT AND TRADEMARK OFFICE
CERTIFICATE OF CORRECTION

PATENT NO. : 9,437,870 B2
APPLICATION NO. : 14/131385
DATED : September 6, 2016
INVENTOR(S) : Lingzhi Zhang et al.

Page 1 of 1

It is certified that error appears in the above-identified patent and that said Letters Patent is hereby corrected as shown below:

On the Title Page

Item (73):
Change:
(73) Assignee: GUANGZHOU INSTITUTE OF ENERGY CONVERSION
To be:
(73) Assignee: GUANGZHOU INSTITUTE OF ENERGY CONVERSION, CHINESE ACADEMY OF SCIENCES Signed and Sealed this
Second Day of April, 2019

Andrei Iancu
*Director of the United States Patent and Trademark Office*